United States Patent [19]

Di Matteo

[11] 3,838,423
[45] Sept. 24, 1974

[54] ANTI-JAMMING CIRCUIT FOR ANGLE TRACKING RADARS

[75] Inventor: Paul L. Di Matteo, Levittown, N.Y.

[73] Assignee: Sperry Rand Corporation, New York, N.Y.

[22] Filed: Oct. 15, 1958

[21] Appl. No.: 767,479

[52] U.S. Cl. .................. 343/7.3, 343/7.4, 343/16 M
[51] Int. Cl. ............................. G01s 9/16, G01s 9/22
[58] Field of Search ............ 343/5, 7, 7.3, 7.4, 16.1, 343/18, 16 M

[56] References Cited
UNITED STATES PATENTS
2,464,258  3/1949  Prichard .............................. 343/7.4

Primary Examiner—Malcolm F. Hubler
Attorney, Agent, or Firm—Howard P. Terry; S. C. Yeaton

[57] Exemplary Claim

3. In a pulsed radar signal tracking receiver, first, second and third means for tracking received signals in the respective polar coordinates of range, elevation and azimuth, said second and third means for tracking being adapted to be actuated solely during the occurrence of a control signal, said first means for tracking in range producing a first output pulse positionable in range and a second output pulse upon the coincidence of said first output pulse and received signal, means resettable at the radar pulse repetition rate for deriving an auxiliary pulse in response to the first signal received during each radar pulse repetition interval, switching means for selectively applying when actuated said first output pulse as said control signal to said second and third means and for selectively applying when deactuated said auxiliary pulse as said control signal to said second and third means, and means for applying said second output pulse to said switching means for actuating said switching means.

4 Claims, 1 Drawing Figure

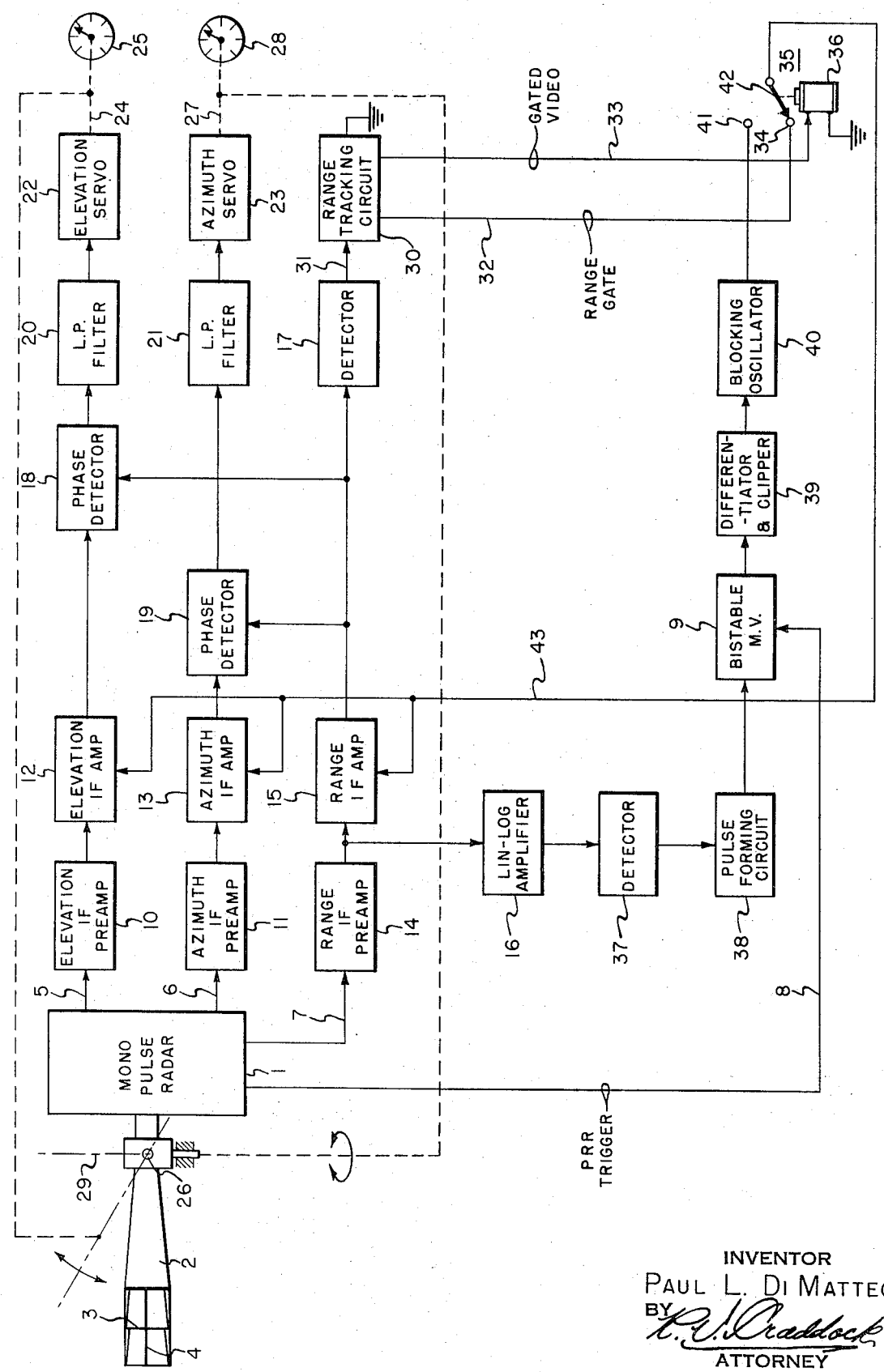

ANTI-JAMMING CIRCUIT FOR ANGLE TRACKING RADARS

The invention herein described was made in the course of or under a contract or subcontract thereunder, with the Department of the Navy.

The present invention relates generally to counter-countermeasure devices and, more particularly, to an anti-jamming circuit for the protection of angle tracking radar receivers.

One well known type of an angle tracking radar is the so called "monopulse" radar. The monopulse radar is adapted to simultaneously emit microwave energy in four adjacent lobe patterns. Each of the lobe patterns is arranged for the irradiation of a respective spatial quadrant located about the boresight or target tracking axis of the radar. By combination of the reflected energies received from within the four quadrants, three control voltages are derived for the positioning of elevation, azimuth and range tracking servos.

Monopulse radars may be additionally provided with pluse gating circuits so that a particular target signal of interest may be isolated from a plurality of received target signals. For this purpose, use is made of the automatic tracking range servo which produces a gating pulse at the time of occurrence of a predetermined target signal relative to the occurrence of the transmitted pulse. The gating pulse is applied to the elevation and azimuth tracking channels to render said channels operative only during the occurrence of the preselected target signal.

In the event that a target is being tracked in elevation, azimuth and range and should the target vehicle then initiate jamming transmissions, the automatic tracking capabilities of the radar may be neutralized. Particularly in the case of jamming signals which are non-coherent with the radar pulse repetition rate, the gating pulse generated by the radar no longer tracks the target signal reliably. On the contrary, the automatic range tracking circuits tend to follow the jamming signal (which usually is of greater amplitude than the normal target return) so that the gating pulse is caused to drift randomly in time. The random drifting of the gating pulse also causes the elevation and azimuth tracking servos to become energized at times other than when the desired target signal is being received. It will be recognized that should the gating signal lose coincidence with the target signal and should the jamming transmissions then cease, not only is range information lost with respect to the desired target but also elevation and azimuth tracking information.

It is the principal object of the present invention to provide an automatic anti-jamming circuit for an angle tracking radar which minimizes the possibility of angle information loss following periods of active jamming.

Another object is to provide apparatus for the generation of an auxiliary gating pulse for application to the tracking servos of a radar receiver upon the loss of coincidence between the target gating pulse and received signals.

A further object is to provide in a radar receiver apparatus for the generation of an automatic target gating pulse and an auxiliary gating pulse, a predetermined one of which is selected for actuating the tracking servos of the radar depending upon the coincidence or lack of coincidence between the target gating pulse and received signals.

These and other objects of the present invention as will become apparent upon a reading of the following specification are achieved in a preferred embodiment by the provision of an antijamming circuit for use in an angle tracking radar of the monopulse type. Three-coordinate target tracking facilities are included in the monopulse radar for the automatic tracking of a preselected target in elevation, azimuth and range. The range tracking circuit of the radar produces a gating pulse coincident with the reception of desired target video. The gating pulse is also applied to the elevation and azimuth tracking servos of the radar to render them operative solely during the reception of desired target positional data.

According to the present invention, means are provided, responsive to the video signals present in the radar range tracking channel, for the generation of an auxiliary gating pulse. Switching means are also included which is adapted to receive both the gating pulse produced by the range tracking circuits of the radar and the auxiliary gating pulse. The switching means is actuated upon the concurrence of the target gating pulse and received signals to apply the target gating pulse to the elevation and azimuth channels of the monopulse radar. The switching means becomes deactuated upon the lack of coincidence between the target gating pulse and received signals to apply the auxiliary gating pulse in lieu of the target gating pulse to the elevation and azimuth channels.

The application of the auxiliary gating pulse to the elevation and azimuth channels permits the uninterrupted tracking of the target both in elevation and azimuth irrespective of the initiation of jamming measures by the target. Inasmuch as the jamming signal emanates from the direction of the target, it can be seen that although range information may be lost because of the jamming signal, accurate angular data continues to be received.

Upon the cessation of jamming by the target, the auxiliary gating pulse is applied to the elevation and azimuth tracking channels until the automatic tracking gate (which reverts to a target acquisition mode of operation) again is brought into coincidence with the desired target signal. When coincidence between the tracking gate and the target signal is re-established, the switching means is again energized to apply the target gating pulse to the elevation and azimuth channels of the monopulse radar.

For a more complete understanding of the present invention, reference should be had to the following specification and to the figure which is a block diagram of a preferred embodiment.

In the sole FIGURE, a conventional monopulse radar is generally represented by the numeral 1. Microwave energy generated by the transmitter included in radar 1 is radiated by four-quadrant horn 2. Radar 1 and horn 2 may be of the type disclosed in U.S. Pat. No. 2,759,154 issued to P. G. Smith et al. on Aug. 14, 1956 and assigned to the present assignee. Horn 2 is divided into four quadrant portions by septums 3 and 4. As described in the aforementioned patent, a comparator device included within radar 1 operates to compare the relative magnitudes of the energies received above and below septum 4 and to compare the relative amplitudes of the energies received on either side of septum 3. A difference signal representing the relative amplitudes of the energies received above and below septum 4 is applied to the input of the elevation tracking channel by line 5. Similarly, the difference signal representing the relative amplitudes of the energies received on either side of septum 3 is directed by line 6 to the input of the azimuth tracking channel.

An additional output is produced by radar 1 for the actuation of the range tracking apparatus. This additional signal is produced on line 7 and is proportional to the sum of the energies received in all four quadrant portions of horn 2. Finally, radar 1 produces on line 8 a series of pulse repetition rate triggers for application to the reset terminal of bistable multivibrator 9.

The elevation and azimuth difference signals are respectively applied to elevation IF preamplifier 10 and to azimuth IF preamplifier 11. The outputs of preamplifiers 10 and 11 are respectively applied to the inputs of elevation IF amplifier 12 and azimuth IF amplifier 13. The output of range IF preamplifier 14, which is proportional to the input sum signal applied via line 7, is directed both to the input of range IF amplifier 15 and lin-log amplifier 16. The output signal of amplifier 15 is applied to detector 17 and as a reference signal to phase detectors 18 and 19. Phase detector 18 receives an additional input signal from the output of amplifier 12; phase detector 19 receives an additional input signal from the output of amplifier 13. The purpose of phase detectors 18 and 19, as more fully described in U.S. Pat. No. 2,759,154 is to generate output signals respectively indicating the amplitude and sense of deviation of the target from the boresight axis of horn 2 both in elevation and in azimuth.

The signal component of interest at the outputs of detectors 18 and 19 is the respective d.c. component which is extracted, respectively, in low pass filters 20 and 21. The output of filter 20 is applied as a control signal to elevation servo 22. Similarly, the d.c. signal output of filter 21 is applied as a control signal to azimuth servo 23. The mechanical shaft output 24 of servo 22 simultaneously positions elevation deviation indicator 25 and horn 2 about horizontal axis 26. The mechanical shaft output 27 of servo 23 connected to azimuth deviation indicator 28 and positions horn 2 about vertical axis 29. The detected signal output of detector 17 is applied to the input of range tracking circuit 30.

Range tracking circuit 30 comprises conventional circuit components for the acquisition of a target signal and for the automatic tracking of said target signal subsequent to its acquisition. Circuit 30 may include, for example, mixer 26, pulse amplifier 27, rectifier 28, variable frequency range gate generator 25 and delay line 29 of U.S. Pat. No. 2,543,072 issued to H. M. Stearns on Feb. 37, 1951 and assigned to the present assignee. Line 31 at the output of detector 17 corresponds to line 42 of FIG. 1 of Stearns.

Two output signals are produced by circuit 30: a range gate is produced on line 32 (corresponding to line 31 of FIG. 1 of Stearns) and gated video signals are produced on line 33 (corresponding to terminal 35 of FIG. 1 of Stearns). Line 32 is connected to contact terminal 34 of relay switch 35 while line 33 is connected to the energization coil 36 of switch 35.

It will be recalled that the signal at the output of range IF preamplifier 14 is proportional to the sum of the signals received in each of the four quadrant portions of horn 2. Inasmuch as active jamming signals usually are substantially greater in amplitude than normal target echo signals, lin-log amplifier 16 is provided to commensurately increase the dynamic range of the auxiliary gating pulse generator of the present invention which is intended to operate under such adverse jamming signal conditions. The output of amplifier 16 is connected to detector 37 which, in cooperation with pulse forming circuit 38, produces a sharp video pulse in response to jamming signals to trigger bistable multivibrator 9.

Multivibrator 9 is automatically reset by the pulse repetition rate triggers appearing on line 8 so that multivibrator 9 is placed into a predetermined condition by the video pulse trigger corresponding to the first signal received subsequent to each pulse transmitted by the radar. The output signal from multivibrator 9 is applied to differentiator and clipper 39 providing an output pulse substantially coincident with the first signal received during each radar pulse repetition interval. The additional pulse of opposite polarity resulting from the differentiation of the multivibrator output signal, corresponding to the resetting of the multivibrator by the pulses of line 8, is rejected by the clipper included within circuit 39. The output pulse from circuit 39 is applied to and triggers blocking oscillator 40. Blocking oscillator 40 generates the auxiliary gating pulse of the present invention which is applied to contact terminal 41 of relay switch 35.

In operation, assuming that a radar target signal is being tracked automatically, both the range gate and gated video pulses are produced, respectively, on lines 32 and 33. The gated video pulses of line 33 energize coil 36 of switch 35 whereby switching member 42 assumes the actuated position indicated in the figure. The range gate pulses of line 32 consequently are applied via actuated member 42 and line 43 to gate on elevation, azimuth and range IF amplifiers 12, 13 and 15 thus permitting the elevation and azimuth servos 22 and 23 to track the target about the boresight axis of horn 2.

Should the radar target initiate active jamming which causes the range gate of line 32 to depart from the true range position of the actual target and follow the jamming signal instead, relay switch 35 remains energized and elevation and azimuth servos 22 and 23 continue their angular tracking operation. Inasmuch as the jamming signal emanates from the same direction as that of the actual target signal, the angular data displayed by deviation indicators 25 and 28 continues to be accurate despite the lack of accurate range data.

In the event that the jamming signal should cease to be transmitted by the target at a time when the range gate is no longer positioned at the range of the target, no gated video signals will be produced on line 33 and relay switch 35 will be deenergized. The deenergization of relay switch 35 precludes the further application of the range gate of line 32 to the IF amplifiers 12, 13 and 15. It will be observed, however, that should the range gate instead have been permitted to actuate amplifiers 12, 13 and 15 following the loss of gated video, no signals would pass through any of said amplifiers and not only would target range data be lost but also target elevation and azimuth data as well.

The present invention is operative to conserve target elevation and azimuth data following the loss of target range data as follows. Despite the assumed lack of coincidence between the range gate and the target signal when jamming transmissions cease, the target signal will still be present at the output of range IF preamplifier 14 and this will be detected in detector 37 to in turn produce the auxiliary gating pulse at the output of blocking oscillator 40. The auxiliary gating pulse is then applied via contact 41 and deactuated member 42 to line 43 to gate on elevation, azimuth and range IF amplifiers 12, 13 and 15. Thus, the auxiliary gating pulse is applied to the IF amplifiers and permits continuity of angle tracking without the interruption that otherwise would be produced in the absence of coincidence between the range gate of line 32 and the target echo signal.

Range tracking circuit 30, like the one disclosed in the aforementioned Stearns patent enters into a target acquisition mode of operation upon the loss of coincidence between the range gate and the target signal. During this target acquisition mode, the auxiliary gating pulse permits the uninterrupted angular tracking of the target as previously discussed. When the range gate again is brought into coincidence with the target signal, gated video pulses reappear on line 33 and actuate relay switch 35 to reapply the range gate of line 32 to IF amplifiers 12, 13 and 15.

In permitting continuity of angular tracking of the target despite the loss of range data resulting from active jamming by the target, the present invention minimizes the time required for the reestablishment of accurate target data following the cessation of the jamming signal. It will be recognized that should the jamming tactics of the target cause the loss not only of range data but of elevation and azimuth data as well, it would become necessary to search in each of the three coordinates of elevation, azimuth and range to reacquire the target. The present invention limits the reacquisition problem to a search through the single coordinate of range.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a radar signal tracking receiver, first and second means for tracking received signals in the respective polar coordinates of range and angle, said second means for tracking in angle being adapted to be actuated solely during the occurrence of a control signal, said first means for tracking in range producing a first output pulse positionable in range and a second output pulse upon the coincidence of said first output pulse and received signal, means for deriving an auxiliary pulse in response to received signal, switching means for selectively applying when actuated said first output pulse as said control signal to said second means and for selectively applying when deactuated said auxiliary pulse as said control signal to said second means, and means for applying said second output pulse to said switching means for actuating said switching means.

2. In a pulsed radar signal tracking receiver, first and second means for tracking received signals in the respective polar coordinates of range and angle, said second means for tracking in angle being adapted to be actuated solely during the occurrence of a control signal, said first means for tracking in range producing a first output pulse positionable in range and a second output pulse upon the coincidence of said first output pulse and received signal, means resettable at the radar pulse repetition rate for deriving an auxiliary pulse in response to the first signal received during each radar pulse repetition interval, means for selectively applying when actuated said first output pulse as said control signal to said second means and for selectively applying when deactuated said auxiliary pulse as said control signal to said second means, and means for applying said second output pulse to said selectively applying means for actuating said selectively applying means.

3. In a pulsed radar signal tracking receiver, first, second and third means for tracking received signals in the respective polar coordinates of range, elevation and azimuth, said second and third means for tracking being adapted to be actuated solely during the occurrence of a control signal, said first means for tracking in range producing a first output pulse positionable in range and a second output pulse upon the coincidence of said first output pulse and received signal, means resettable at the radar pulse repetition rate for deriving an auxiliary pulse in response to the first signal received during each radar pulse repetition interval, switching means for selectively applying when actuated said first output pulse as said control signal to said second and third means and for selectively applying when deactuated said auxiliary pulse as said control signal to said second and third means, and means for applying said second output pulse to said switching means for actuating said switching means.

4. Apparatus as defined in claim 3 wherein said means for deriving said auxiliary pulse includes bistable means responsive to received signals and radar pulse repetition rate triggers for producing an output waveform having a leading edge determined by the occurrence of the first signal received during each radar pulse repetition interval and a trailing edge coherent with a respective one of said triggers, and means responsive to the leading edge of said output waveform for producing said auxiliary pulse.

* * * * *